(12) United States Patent
Andoh

(10) Patent No.: US 9,038,959 B2
(45) Date of Patent: May 26, 2015

(54) SPACE DEBRIS REMOVER

(71) Applicant: Fukashi Andoh, Toyota (JP)

(72) Inventor: Fukashi Andoh, Toyota (JP)

(*) Notice: Subject to any disclaimer, the term of this patent is extended or adjusted under 35 U.S.C. 154(b) by 29 days.

(21) Appl. No.: 14/064,226

(22) Filed: Oct. 28, 2013

(65) Prior Publication Data

US 2015/0115107 A1 Apr. 30, 2015

(51) Int. Cl.
*B64G 1/10* (2006.01)
*B64G 1/24* (2006.01)
*B64G 1/64* (2006.01)

(52) U.S. Cl.
CPC .............. *B64G 1/1078* (2013.01); *B64G 1/242* (2013.01); *B64G 1/646* (2013.01); *B64G 2001/245* (2013.01)

(58) Field of Classification Search
CPC ....... B64G 1/1078; B64G 1/242; B64G 1/646
See application file for complete search history.

(56) References Cited

U.S. PATENT DOCUMENTS

| | | | |
|---|---|---|---|
| 5,421,540 A * | 6/1995 | Ting ............................ | 244/158.1 |
| 6,845,303 B1 * | 1/2005 | Byler ............................ | 701/13 |
| 8,193,968 B1 * | 6/2012 | Kia et al. ..................... | 342/26 A |
| 8,403,269 B2 * | 3/2013 | Stone et al. ................. | 244/171.1 |
| 8,464,983 B2 * | 6/2013 | Knirsch ....................... | 244/158.2 |
| 8,469,314 B2 * | 6/2013 | Ganguli et al. ............. | 244/158.1 |
| 8,485,475 B2 * | 7/2013 | Allen et al. .................. | 244/158.2 |
| 2005/0103939 A1* | 5/2005 | Bischof et al. ............... | 244/161 |
| 2011/0139936 A1* | 6/2011 | Allen et al. .................. | 244/158.2 |
| 2011/0192936 A1* | 8/2011 | Knirsch ....................... | 244/158.2 |
| 2011/0198446 A1* | 8/2011 | Knirsch et al. ............. | 244/171.7 |
| 2011/0210208 A1* | 9/2011 | Ganguli et al. ............. | 244/158.1 |
| 2012/0097799 A1* | 4/2012 | Stone et al. ................. | 244/171.7 |
| 2012/0286100 A1* | 11/2012 | Knirsch ....................... | 244/172.6 |
| 2013/0175401 A1* | 7/2013 | Starke et al. ................ | 244/171.1 |

* cited by examiner

*Primary Examiner* — Joseph W Sanderson

(57) ABSTRACT

A space debris remover aiming to remove a space debris object in earth orbits. Angular thrust calculation unit calculates angular thrust. Radial thrust calculation unit calculates radial thrust based on the angular thrust, estimated angular momentum and estimated space debris mass. A foam bonding mechanism connects the space debris remover and the space debris object. A space debris removal controller calculates firing time, and sends a space debris removal control signal comprising the radial thrust, the angular thrust and the firing time. A plurality of first stage thrusters generate the radial thrust and the angular thrust after the firing time. After the stage separator separates a first stage and a second stage of the space debris remover, a plurality of second stage thrusters generate the radial thrust and the angular thrust, and propel the space debris object towards the sun.

1 Claim, 5 Drawing Sheets

SPACE DEBRIS REMOVER

BACKGROUND OF THE INVENTION

The present invention relates to a space debris remover to remove a space debris object in a low earth orbit, a medium earth orbit, a geostationary orbit or a high earth orbit by sending the space debris object to the sun. The space debris object particularly considered by the present invention is of the size of a dead spacecraft, a rocket booster or a debris object from an anti-satellite weapon that presents a threat of collision to an unmanned/or manned spacecraft, and presents a risk of crashing in populated area in case of reentry to the earth's atmosphere and scattering hazardous chemicals.

A prior art employs an orbital debris removal and asset protection assembly that breaks up a space debris object into smaller pieces using a plurality of netting layers of meshed composite fibers. Another prior art employs a towing apparatus for a spacecraft that tows a spacecraft using a cable attached to the spacecraft. Another prior art employs a debris removal management system that intercepts a space debris object using a plurality of net sections. Another prior art employs a system for inducing rapid reentry of an orbital debris object that deploys dust to the orbital debris object to artificially enhance drag on the orbital debris object and induces rapid reentry of the orbital debris object.

The orbital debris removal and asset protection assembly, if applied to a space debris object of the size of a dead spacecraft, a rocket booster or a debris object from an anti-satellite weapon, fails to break up the space debris object into smaller pieces, and does not fit for removal of a space debris object of the size considered in the present invention. The towing apparatus and the debris removal management system can only move a space debris object within a plurality of earth orbits, and cannot reduce the number of space debris objects in the plurality of earth orbits. The towing apparatus and the debris removal management system are costly and inefficient considering the growing number of space debris objects. Inducing reentry of the space debris object presents a risk on earth as a space debris object of the size considered in the present invention does not burn up in the atmosphere and can reach the ground.

SUMMARY OF THE INVENTION

The present invention provides a space debris remover to remove a space debris object of the size of a dead spacecraft, a rocket booster or a debris object from an anti-satellite weapon that presents a threat of collision to an unmanned or manned spacecraft, and presents a risk of crashing in populated area in case of reentry to the earth's atmosphere and scattering hazardous chemicals, in a low earth orbit, a medium earth orbit, a geostationary orbit or a high earth orbit by sending the space debris object to the sun.

The space debris remover includes:
- a vision sensor capturing a video image of the space debris object while the space debris remover chases, leads or travels in parallel with the space debris object maintaining constant distance with the space debris object;
- a center of gravity estimator selecting two points on the space debris object (hereinafter referred to as a "first point" and a "second point") in the video image of the space debris object from the vision sensor at a time instant (hereinafter referred to as a "first time instant"), tracking the first point and the second point until a later time instant (hereinafter referred to as "second time instant"); estimating center of gravity of the space debris object as an intersection of a segment connecting the first point at the first time instant and the second point at the first time instant, and a segment connecting the first point at the second time instant and the second point at the second time instant;
- a rendezvous controller calculating a rendezvous control signal to propel the space debris remover towards the center of gravity of the space debris object, and to let a foam bonding mechanism stick to the space debris object when the space debris remover comes in contact with the space debris object;
- a star tracker measuring radial position of the space debris object with respect to the earth and angular position of the space debris object with respect to the earth;
- a space debris mass estimation controller generating a space debris mass estimation control signal to apply constant force to the space debris object (hereinafter referred to as "mass estimation force") for a period of time (hereinafter referred to as a "mass estimation time period");
- a space debris mass estimator estimating mass of the space debris object by dividing the mass estimation force based on the space debris mass estimation control signal from the space debris mass estimation controller by a product of the radial position of the space debris object with respect to the earth and a second order time derivative of the angular position of the space debris object with respect to the earth from the star tracker;
- an angular thrust calculation unit calculating angular thrust as an impulse function of time with amplitude thereof inversely proportional to desirable time of travel of the space debris object to the sun;
- an angular momentum estimator estimating angular momentum of the space debris object by subtracting a first order time integral of the angular thrust from a product of effective mass of the space debris object and the earth, a square of the radial position of the space debris object with respect to the earth and a first order time derivative of the angular position of the space debris object with respect to the earth;
- a radial thrust calculation unit calculating radial thrust as a function of the first order time integral of the angular thrust, the angular momentum of the space debris object, the mass of the space debris object and the radial position of the space debris object with respect to the earth inversely proportional to a square of the radial position of the space debris object with respect to the earth;
- a space debris removal controller calculating the time of travel of the space debris object to the sun as a function of the radial position of the space debris object with respect to the earth and a first order time derivative of the angular position of the space debris object with respect to the earth inversely proportional to a square of the radial position of the space debris object with respect to the earth and the first order time derivative of the angular position of the space debris object with respect to the earth; and calculating a time for a plurality of first stage thrusters to generate the radial thrust and the angular thrust (hereinafter referred to as "firing time");
- a plurality of first stage thrusters propelling the space debris remover to the center of gravity of the space debris object based on the redezvous control signal while receiving the rendezvous control signal from the rendezvous controller; applying the mass estimation force to the space debris object while receiving the space debris mass estimation control signal from the space debris mass estimation controller; and generating the radial thrust and the angular thrust after the firing time based on the space debris removal control signal from the space debris removal controller;

a stage separator separating a first stage of the space debris remover comprising the plurality of first stage thrusters, and a second stage of the space debris remover comprising a plurality of second stage thrusters and a foam bonding mechanism at a time instant after the radial thrust decreases below a predetermined value (hereinafter referred to as "separation time");

a plurality of second stage thrusters generating the radial thrust and the angular thrust after the separation time, and propelling the space debris object towards the sun; and a foam bonding mechanism sticking to the space debris object when the space debris remover comes in contact with the space debris object.

With this construction, a space debris object of the size of a dead spacecraft, a rocket booster or a debris object from an anti-satellite weapon that presents a threat of collision to an unmanned or manned spacecraft, and presents a risk of crashing in populated area in case of reentry to the earth's atmosphere and scattering hazardous chemicals can be removed from earth orbits more efficiently, certainly and safely with less cost than the prior arts.

BRIEF DESCRIPTION OF THE DRAWINGS

The novel features of the invention will be readily understood and appreciated by reference to the following detailed description taken in conjunction with the drawings, in which.

DETAILED DESCRIPTION OF THE INVENTION

Figure 1:
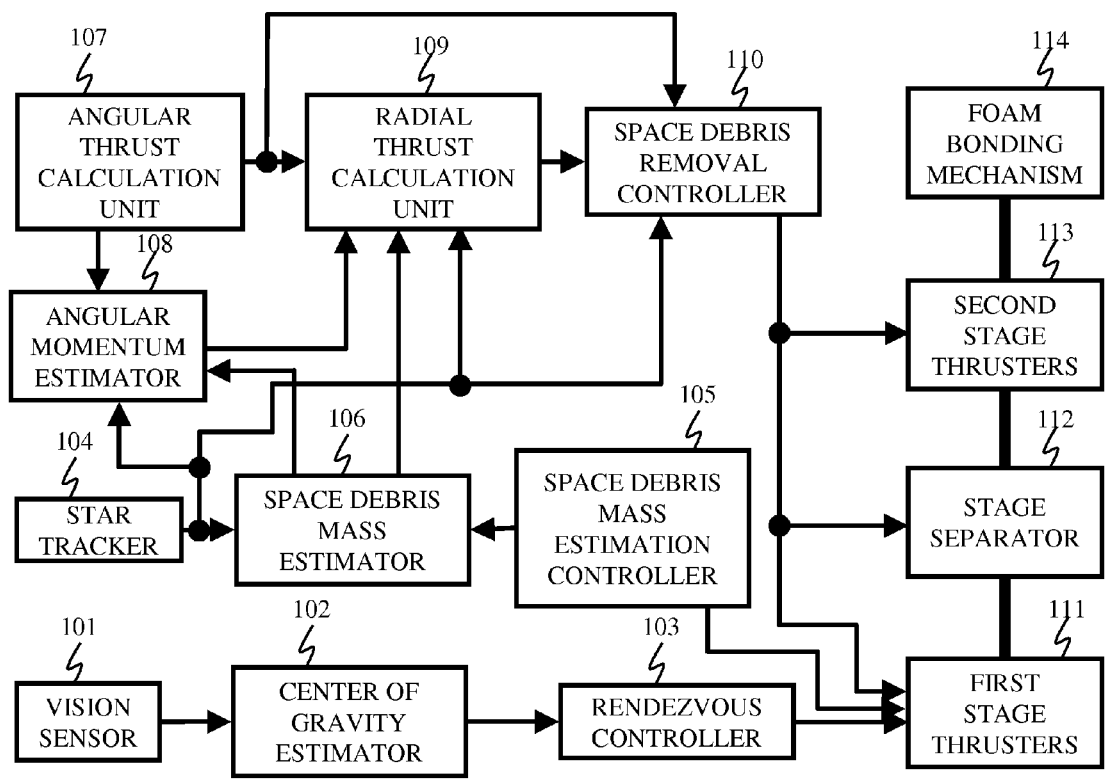
FIG. 1 is a block diagram of a space debris remover in accordance with an exemplary embodiment of the invention.

FIG. 1 is a block diagram of a space debris remover in accordance with an exemplary embodiment of the invention. The space debris remover includes: a vision sensor 101, a center of gravity estimator 102, a rendezvous controller 103, a star tracker 104, a space debris mass estimation controller 105, a space debris mass estimator 106, an angular thrust calculation unit 107, an angular momentum estimator 108, a radial thrust calculation unit 109, a space debris removal controller 110, a plurality of first stage thrusters 111, a stage separator 112, a plurality of second stage thrusters 113 and a foam bonding mechanism 114.

The vision sensor 101 captures a video image of the space debris object while the space debris remover chases, leads or travels in parallel with the space debris object maintaining constant distance with the space debris object, and sends the video image of the space debris object to the center of gravity estimator 102.

The center of gravity estimator 102 selects two points on the space debris object (hereinafter referred to as a "first point" and a "second point") in the video image of the space debris object from the vision sensor 101 at a time instant (hereinafter referred to as a "first time instant"), tracks the first point and the second point until a later time instant (hereinafter referred to as a "second time instant"); estimates center of gravity of the space debris object as an intersection of a segment connecting the first point at the first time instant and the second point at the first time instant, and a segment connecting the first point at the second time instant and the second point at the second time instant; and sends the center of gravity of the space debris object to the rendezvous controller 103.

The rendezvous controller 103 calculates a rendezvous control signal to propel the space debris remover towards the center of gravity of the space debris object, and to let the form bonding mechanism 114 stick to the space debris object when the space debris remover comes in contact with the space debris object, and sends the rendezvous control signal to the plurality of first stage thrusters 111.

The star tracker 104 measures radial position of the space debris object with respect to the earth and angular position of the space debris object with respect to the earth, and sends them and their time derivatives to the space debris mass estimator 106, the angular momentum estimator 108, the radial thrust calculation unit 109 and the space debris removal controller 110.

The space debris mass estimation controller 105 generates a space debris mass estimation control signal to apply constant force (hereinafter referred to as "mass estimation force") to the space debris object for a period of time (hereinafter referred to as a "mass estimation time period"), and sends the space debris mass estimation control signal to the space debris mass estimator 106 and the plurality of first stage thrusters 111.

The space debris mass estimator 106 estimates mass of the space debris object by dividing the mass estimation force based on the space debris mass estimation control signal from the space debris mass estimation controller 105 by a product of the radial position of the space debris object with respect to the earth and a second order time derivative of the angular position of the space debris object with respect to the earth from the star tracker 104, and sends the mass of the space debris object to the angular momentum estimator 108 and the radial thrust calculation unit 109.

The angular thrust calculation unit 107 calculates angular thrust as an impulse function of time with amplitude thereof inversely proportional to desirable time of travel of the space debris object to the sun, and sends the angular thrust to the angular momentum estimator 108, the radial thrust calculation unit 109 and the space debris removal controller 110.

The angular momentum estimator 108 estimates angular momentum of the space debris object by subtracting a first order time integral of the angular thrust from a product of effective mass of the space debris object and the earth, a square of the radial position of the space debris object with respect to the earth and a first order time derivative of the angular position of the space debris object with respect to the earth; and sends the angular momentum of the space debris object to the radial thrust calculation unit 109.

The radial thrust calculation unit 109 calculates radial thrust as a function of the first order time integral of the angular thrust, the angular momentum of the space debris object, the mass of the space debris object and the radial position of the space debris object with respect to the earth inversely proportional to a square of the radial position of the space debris object with respect to the earth; and sends the radial thrust to the space debris removal controller 110.

The space debris removal controller 110 calculates the time of travel of the space debris object to the sun as a function of the radial position of the space debris object with respect to the earth and the first order time derivative of the angular position of the space debris object with respect to the earth inversely proportional to a square of the radial position of the space debris object with respect to the earth and the first order time derivative of the angular position of the space debris object with respect to the earth; calculates time for the plurality of first stage thrusters 111 to generate the radial thrust and the angular thrust (hereinafter referred to as "firing time"); and sends a space debris removal control signal comprising the radial thrust, the angular thrust and the firing time to the plurality of first stage thrusters 111, the stage separator 112 and the plurality of second stage thrusters 113.

The plurality of first stage thrusters 111 propel the space debris remover to the center of gravity of the space debris object based on the rendezvous control signal while receiving the rendezvous control signal from the rendezvous controller 103; apply the mass estimation force to the space debris object while receiving the space debris mass estimation control signal from the space debris mass estimation controller 105; and generate the radial thrust and the angular thrust after the firing time based on the space debris removal control signal from the space debris removal controller 110.

The stage separator 112 separates a first stage of the space debris remover comprising the plurality of first stage thrusters 111, and a second stage of the space debris remover comprising the plurality of second stage thrusters 113 and the foam bonding mechanism 114 at a time instant after the radial thrust decreases below a predetermined value (hereinafter referred to as "separation time").

The plurality of second stage thrusters 113 generate the radial thrust and the angular thrust after the separation time and propel the space debris object towards the sun.

The foam bonding mechanism 114 sticks to the space debris object when the space debris remover comes in contact with the space debris object.

Figure 3:
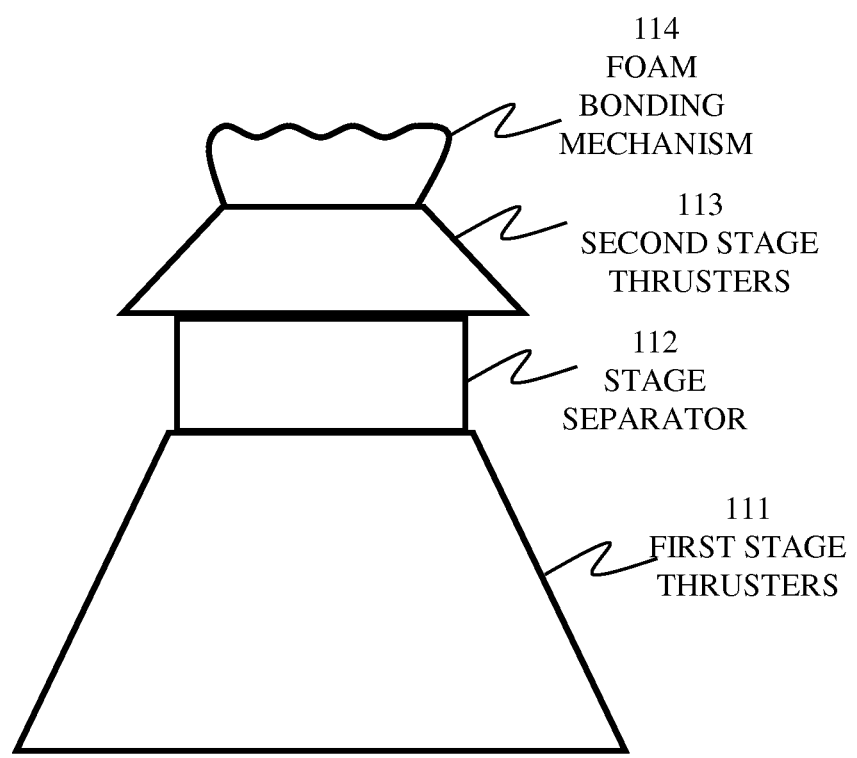
FIG. 3 is a mechanical construction of a space debris remover in accordance with an exemplary embodiment of the invention.

FIG. 3 is a mechanical construction of the space debris remover in accordance with an exemplary embodiment of the invention. The plurality of first stage thrusters 111 consist of a plurality of thrusters, each of which is oriented in a different direction from the others such that a combination thereof can generate both the radial thrust and the angular thrust.

The stage separator 112 consists of a stage separation controller calculating the separation time and a stage separation mechanism that separates the first stage of the space debris remover and the second stage of the space debris remover at the separation time.

The plurality of second stage thrusters 113 consist of a plurality of thrusters, each of which is oriented in a different direction from the others such that a combination thereof can generate both the radial thrust and the angular thrust.

The foam bonding mechanism 114 consists of foam that takes the shape of the space debris object surface and maintains contact with the space debris object by the foam bonding effect.

Derived in what follows is a principle whereby the radial thrust calculation unit 109 calculates the radial thrust and the space debris removal controller 110 calculates the firing time.

Equations of motion of the space debris remover are derived as (1) and (2).

$$\mu \ddot{r}_{12} - \mu r_{12} \dot{\theta}_{12}^2 + G \frac{m_1 m_2}{r_{12}^2} - f_{r12} \quad (1)$$

$$\mu r_{12}^2 \dot{\theta}_{12} - F_{\theta 12} = l_{12} \quad (2)$$

where $\mu$ is effective mass of the space debris object and the earth [kg], $m_1$ is mass of the space debris object [kg], $m_2$ is mass of the earth [kg], $r_{12}$ is the radial position of the space debris object with respect to the earth [m], $\theta_{12}$ is the angular position of the space debris object with respect to the earth [rad], G is gravitational constant [N·m$^2$/kg$^2$], $f_{r12}$ is the radial thrust [N], $F_{\theta 12}$ is a first order time integral angular [N·s] and $l_{12}$ is the angular momentum of the space debris object [kg·m$^2$·rad/s].

From (1) and (2), an equation of an orbit of the space debris object is derived as (3).

$$r_{12} = \frac{\frac{(l_{12} + F_{\theta 12})^2}{\mu(Gm_1 m_2 - r_{12}^2 f_{r12})}}{1 + \frac{A_{12}(l_{12} + F_{\theta 12})^2}{\mu(Gm_1 m_2 - r_{12}^2 f_{r12})} \cos \theta_{12}} \quad (3)$$

From (3), semi-latus rectum p and eccentricity e are obtained as (4) and (5).

$$p = \frac{(l_{12} + F_{\theta 12})^2}{\mu(Gm_1 m_2 - r_{12}^2 f_{r12})} \quad (4)$$

$$e = \frac{A_{12}(l_{12} + F_{\theta 12})^2}{\mu(Gm_1 m_2 - r_{12}^2 f_{r12})} \quad (5)$$

where $A_{12}$ is obtained by evaluating (3) at $\theta_{12}=0$ as (6).

$$A_{12} = \left[ \frac{1}{r_{12}} - G \frac{\mu m_1 m_2}{(l_{12} + F_{\theta 12})^2} + \frac{\mu r_{12}^2 f_{r12}}{(l_{12} + F_{\theta 12})^2} \right] \bigg|_{\theta_{12}=0} \quad (6)$$

Rewriting (3) using (5) yields (7).

$$\cos \theta_{12} = \frac{1}{A_{12} r_{12}} - \frac{1}{e} \quad (7)$$

If (8) holds, the orbit of the space debris object intersects with the sun.

$$\cos \theta_{12} \bigg|_{r_{12} = \sqrt{r_{23}^2 - R_3^2}} \in \left[ -1, -\frac{\sqrt{r_{23}^2 - R_3^2}}{r_{23}} \right] \quad (8)$$

Rewriting (7) and (8) yields (9) and (10).

$$e \geq \frac{A_{12} \sqrt{r_{23}^2 - R_3^2}}{1 + A_{12} \sqrt{r_{23}^2 - R_3^2}} \quad (9)$$

$$e \le \frac{A_{12}r_{23}\sqrt{r_{23}^2 - R_3^2}}{A_{12}(r_{23}^2 - R_3^2) + r_{23}} \quad (10)$$

To send the space debris object to the sun with minimum energy, the eccentricity of the orbit of the space debris object is chosen as the minimum value in (9) and (10) as (11).

$$e = \frac{A_{12}\sqrt{r_{23}^2 - R_3^2}}{1 + A_{12}\sqrt{r_{23}^2 - R_3^2}} \quad (11)$$

Since e<1 holds, the orbit of the space debris object in (3) is an ellipse. Solving (5) and (11) for the radial thrust $f_{r12}$ yields (12).

$$f_{r12} = \frac{Gm_1m_2}{r_{12}^2} - \frac{(l_{12} + F_{\theta 12})^2}{\mu r_{12}^2} \frac{1 + A_{12}\sqrt{r_{23}^2 - R_3^2}}{\sqrt{r_{23}^2 - R_3^2}} \quad (12)$$

Since the semi-latus rectum p in (4) represents speed of travel of the space debris object, the first order time integral of the radial thrust $F_{\theta 12}$ can be determined based on required speed of travel of the space debris object. For instance, the first order time integral of the radial thrust $F_{\theta 12}$ is increased for larger required speed of travel of the space debris object.

To minimize the financial cost of a space debris removal mission, it is desirable to design the second stage of the space debris remover comprising the plurality of second stage thrusters 113 and the foam bonding mechanism 114 as small as possible. For this reason, the radial thrust $f_{r12}$ at $\theta_{12}=0$ and thus $A_{12}$ is maximized.

Kepler's second law with constant areal speed $v_A$ [m²/s] yields (13).

$$\frac{1}{2}r_{12}^2\dot{\theta}_{12} = v_A \quad (13)$$

Since the area swept by a line joining the space debris object and the earth becomes half of the area of an elliptic orbit of the space debris object with respect to the earth of eccentricity e given by (11), integrating (13) over time of travel of the space debris object to the sun T [s] yields (14).

$$v_A T = \frac{\pi ab}{2} \quad (14)$$

Semi-major axes a and b in (14) are explicitly given as (15) and (16).

$$a = \frac{p}{1 - e^2} \quad (15)$$

$$b = \frac{p}{\sqrt{1 - e^2}} \quad (16)$$

The semi-latus rectum p in (4) is expressed in terms of eccentricity e in (5) as (17).

$$p = \frac{e}{A_{12}} \quad (17)$$

Solving (14) for the time of travel of the space debris object to the sun T and substituting (15), (16) and (17) yields (18).

$$T = \frac{\pi}{2A_{12}^2 v_A} \frac{e^2}{(1 - e^2)^{\frac{3}{2}}} \quad (18)$$

Letting time of application of the radial thrust $f_{r12}$ and the angular thrust $f_{\theta 12}=d(F_{\theta 12})/dt$ be t=0, the sun, the earth and the space debris object are on a straight line in this order at $t=-t_0$ where $t_0$ is given by (19).

$$t_0 = \frac{1}{\omega_{12} - \text{mod}(\omega_{23}T, 2\pi)} \text{mod}(\omega_{23}T, 2\pi) \quad (19)$$

Figure 2:
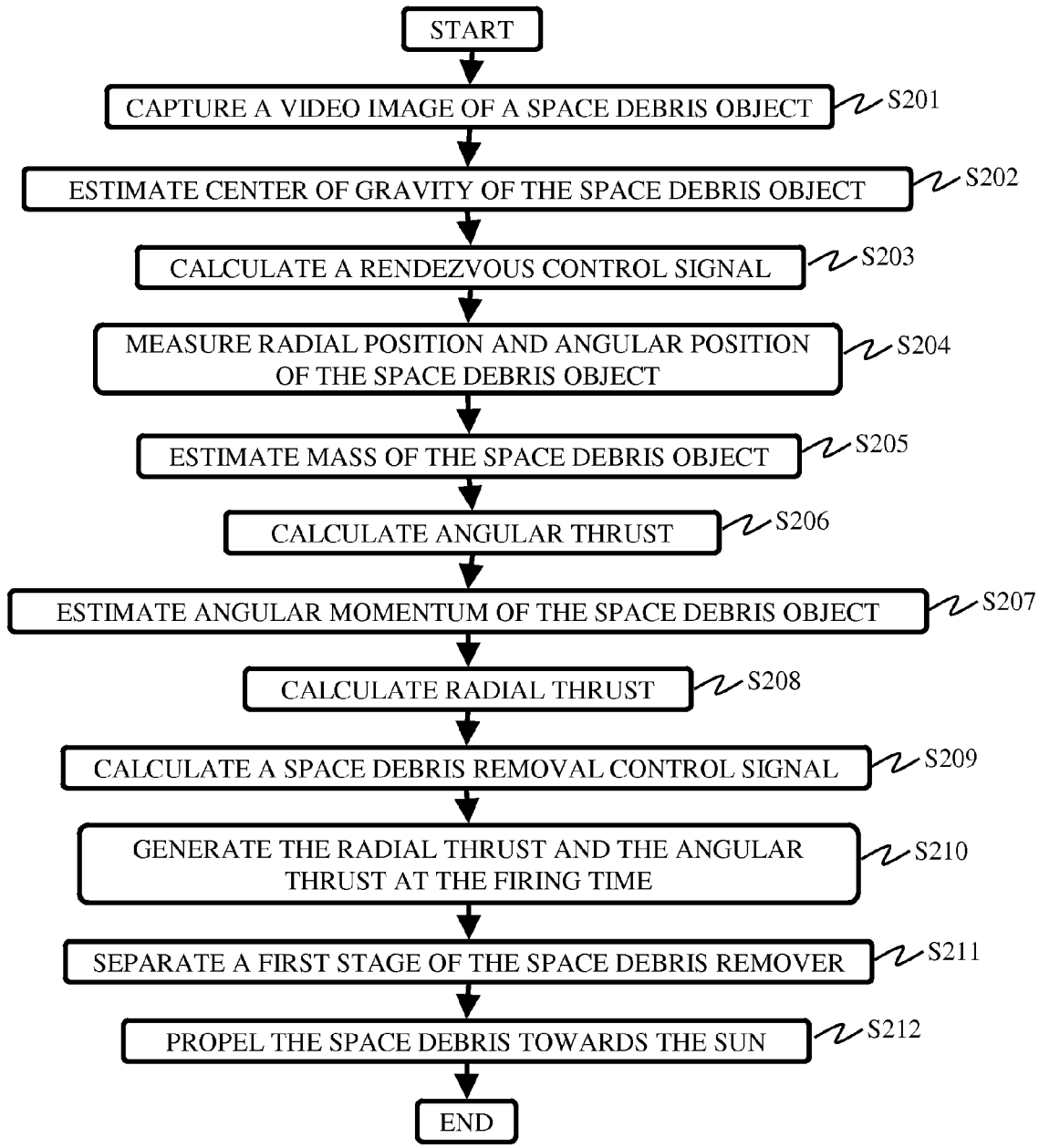
FIG. 2 is a flowchart showing a processing flow of the space debris remover in accordance with an exemplary embodiment of the invention.

Next a processing flow of the space debris remover is described using FIG. 2. FIG. 2 is a flowchart showing a processing flow of the space debris remover in accordance with an exemplary embodiment of the invention. The vision sensor 101 captures the video image of the space debris object while the space debris remover chases, leads or travels in parallel with the space debris object maintaining constant distance with the space debris object, and sends the video image of the space debris object to the center of gravity estimator 102 (S201).

The center of gravity estimator 102 estimates the center of gravity of the space debris object and sends the center of gravity of the space debris object to the plurality of first stage thrusters 111 (S202).

The rendezvous controller 103 calculates the rendezvous control signal to propel the space debris remover towards the center of gravity of the space debris object, and to let the foam bonding mechanism 114 stick to the space debris object when the space debris remover comes in contact with the space debris object, and sends the rendezvous control signal to the plurality of first stage thrusters 111 (S203).

The star tracker 104 measures the radial position of the space debris object with respect to the earth $r_{12}$ and the angular position of the space debris object with respect to the earth $\theta_{12}$, and sends them and their time derivatives to the space debris mass estimator 106, the angular momentum estimator 108, the radial thrust calculation unit 109 and the space debris removal controller 110 (S204).

The space debris mass estimation controller 105 generates the space debris mass estimation control signal to apply the mass estimation force to the space debris object for the mass estimation time period, and sends the space debris mass estimation control signal to the space debris mass estimator 106 and the plurality of first stage thrusters 111. The space debris mass estimator 106 estimates the mass of the space debris object $m_1$ by dividing the mass estimation force based on the space debris mass estimation control signal from the space debris mass estimation controller 105 by a product of the radial position of the space debris object with respect to the earth $r_{12}$ and a second order time derivative of the angular position of the space debris object with respect to the earth $d^2(\theta_{12})/dt^2$ from the star tracker 104, and sends the mass of the space debris object $m_1$ to the angular momentum estimator 108 and the radial thrust calculation unit 109 (S205).

The angular thrust calculation unit 107 calculates the angular thrust $f_{r12}$ as an impulse function of time with amplitude thereof inversely proportional to the desirable time of travel of the space debris object to the sun, and sends the angular thrust $f_{r12}$ to the angular momentum estimator 108, the radial thrust calculation unit 109 and the space debris removal controller 110 (S206).

The angular momentum estimator 108 estimates the angular momentum of the space debris object $l_{12}$ using (2), and sends the angular momentum of the space debris object $l_{12}$ to the radial thrust calculation unit 109 (S207).

The radial thrust calculation unit 109 calculates the radial thrust $f_{r12}$ using (12), and sends the radial thrust $f_{r12}$ to the space debris removal controller 110 (S208).

The space debris removal controller 110 sends the space debris removal control signal comprising the radial thrust $f_{r12}$ in (12), the angular thrust $f_{\theta12}$ and the firing time t=0 found using (19) to the plurality of first stage thrusters 111, the stage separator 112 and the plurality of second stage thrusters 113 (S209).

The plurality of first stage thrusters 111 generate the radial thrust $f_{r12}$ in (12) and the angular thrust $f_{\theta12}$ at the firing time t=0 (S210).

The stage separator 112 separates the first stage of the space debris remover and the second stage of the space debris remover at the separation time (S211).

The plurality of second stage thrusters 113 generate the radial thrust $f_{r12}$ in (12) and the angular thrust $f_{\theta12}$ after the separation time, and propel the space debris object towards the sun (S212).

Hereinafter, simulation results of aforementioned control processes of the space debris remover in accordance with an exemplary embodiment of the invention are described in detail. The simulation assumes a space mission wherein a space debris remover sends a space debris object in a low earth orbit to the sun. Parameters used in the simulation are given in (20).

$$m_1=1,000 \text{ [kg]}, m_2=5.972\times10^{24} \text{ [kg]}, m_3=1.989\times10^{30} \text{ [kg]}, r_{23}=1.496\times10^{11} \text{ [m]},$$

$$f_{\theta12}=0 \text{ [N]}, R_2=6,371,000 \text{ [m]}, R_3=6.963\times10^{8} \text{ [m]}, G=6.674\times10^{-11} \text{ [N·m}^2\text{/kg}^2\text{]},$$

$$R_{LEO}=2.000\times10^{6} \text{ [m]} \quad (20)$$

where $m_3$ is mass of the sun [kg], $R_2$ is radius of the earth [m] and $R_3$ is radius of the sun [m], and $R_{LEO}$ is radius of the low earth orbit [m]. In the space mission considered in the simulation, there is no requirement for time of travel of the space debris object to the sun, and angular thrust $f_{\theta12}$ is set to zero.

Figure 4:
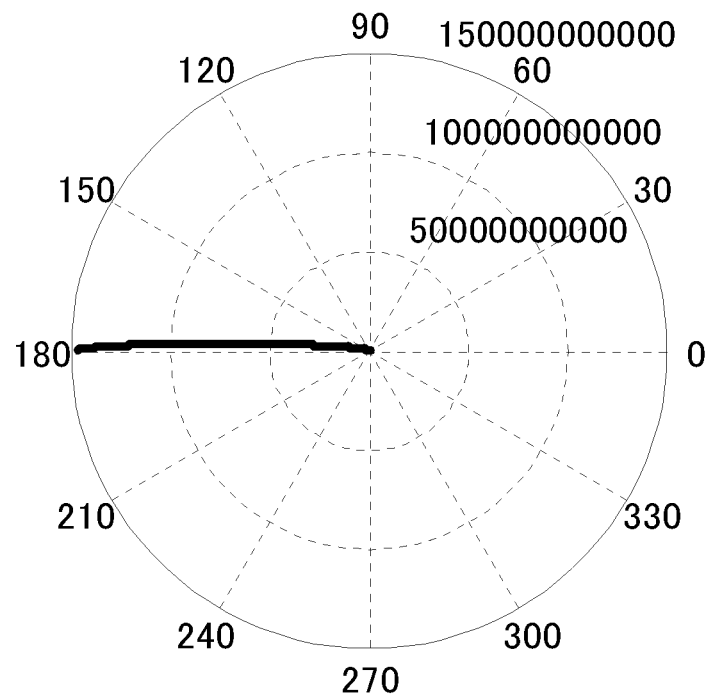
FIG. 4 is a simulation result of an exemplary embodiment of the invention showing a trajectory of the space debris object in a polar coordinate system with respect to the earth with the present invention.

FIG. 4 is a simulation result of an exemplary embodiment of the invention showing a trajectory of the space debris object in a polar coordinate system with respect to the earth with the present invention. In FIG. 4 dashed lines and circles represent a polar coordinate system with respect to the earth, a solid circle represents the distance of the sun, and a solid line represents a trajectory of the space debris object with the present invention. In the polar coordinate system with respect to the earth, radial axes are shown in [m] and angular axes are shown in [deg]. FIG. 4 shows that the space debris object reaches the sun at the distance $1.496\times10^{11}$ [m] and the angle 180 [deg].

Figure 5:
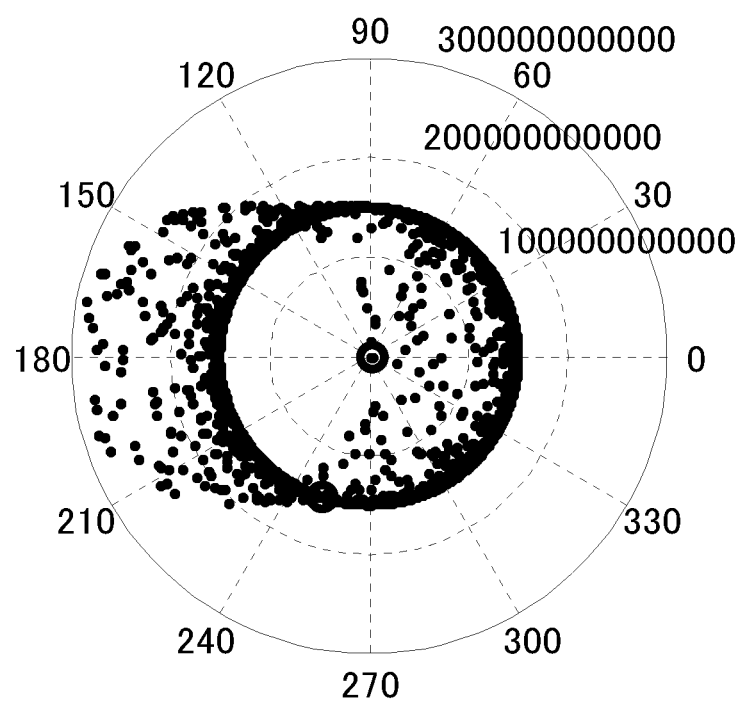
FIG. 5 is a simulation result of an exemplary embodiment of the invention showing a trajectory of the space debris object in a polar coordinate system with respect to the sun with the present invention.

FIG. 5 is a simulation result of an exemplary embodiment of the invention showing a trajectory of the space debris object in a polar coordinate system with respect to the sun with the present invention. In FIG. 5 dashed lines and circles represent a polar coordinate system with respect to the sun, a small circle at $1.496\times10^{11}$ [m] and 251.2 [deg] represents the location of the space debris object at the firing time t=0 [s], a small circle at the origin represents the location of the space debris object at the end of the simulation, and dots represent the locations of the space debris object at different time instants during the simulation. FIG. 5 shows that the radial thrust $f_{r12}$ in (12) propels the space debris object from a point on the low earth orbit $1.496\times10^{11}$ [m] and 251.2 [deg] to the sun at the origin.

Figure 6:
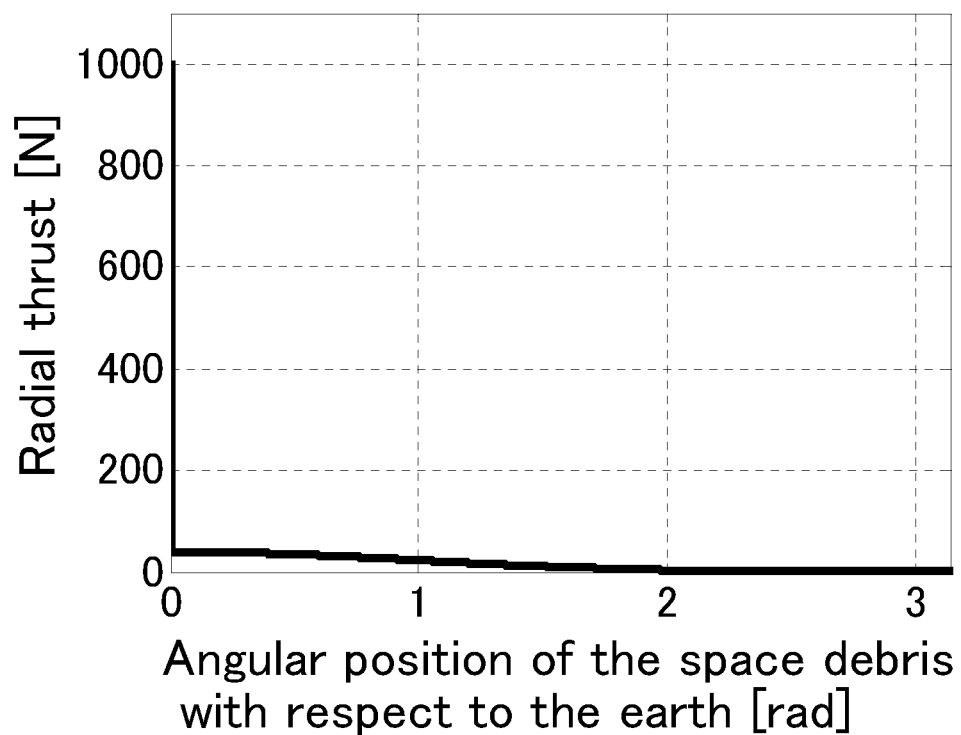
FIG. 6 is a simulation result of an exemplary embodiment of the invention showing radial thrust with the present invention.

FIG. 6 is a simulation result of an exemplary embodiment of the invention showing the radial thrust with the present invention. In FIG. 6 a solid line represents the radial thrust $f_{r12}$ in (12) after the space debris remover docks with the space debris object and the mass of the space debris object is estimated. As in FIG. 6 when the angular position of the space debris object with respect to the earth is $\theta_{r12}=0$ [rad] at the firing time t=0 [s], the radial thrust $f_{r12}$ of 1,000 [N] is generated by the plurality of first stage thrusters 111. When the angular position of the space debris object with respect to the earth becomes $\theta_{r12}=3.137\times10^{-4}$ [rad] at the separation time t=110.2 [s], the radial thrust $f_{r12}$ is reduced to 39.59 [N] and the stage separator 112 separates the first stage and the second stage with the space debris object. After the separation time t=110.2 [s], the plurality of second stage thrusters 113 generate the radial thrust $f_{r12}$ monotonically decreasing from 39.59 [N] to $1.796\times10^{-5}$ [N] until the space debris object arrives at the sun at $t=2.835\times10^{10}$ [s] (899.1 [years]).

Although, in the foregoing embodiment, the space debris object orbiting on a low earth orbit is considered, a space debris object orbiting on a medium earth orbit, a geostationary orbit or a high earth orbit can be removed by the present invention.

The center of gravity estimator 102, the rendezvous controller 103, the space debris mass estimation controller 105, the space debris mass estimator 106, the angular thrust calculation unit 107, the angular momentum estimator 108, the radial thrust calculation unit 109 and the space debris removal controller 110 can be realized as an electrical/electronic/programmable electronic system. Examples of the electrical/electronic/programmable electronic system include but are not limited to a control system comprising an application specific integrated circuit (ASIC) and a microcontroller.

In the above simulation, the space debris object is sent to the sun. The destination of the space debris object propelled by the present invention can be selected as a different location in the universe by replacing (8) with a different condition for the angular position of the space debris object with respect to the earth $\theta_{12}$.

While, in the foregoing embodiment, a foam bonding mechanism is used to connect the space debris remover and the space debris object, a different means such as a magnetic joint can be employed to connect the space debris remover and the space debris object.

The described embodiments of the present invention are only exemplary and numerous variations thereof apparent to those skilled in the art are intended to be within the scope of the present invention as defined in the following claims.

The invention claimed is:

1. A space debris remover for a space debris object of the size of a dead spacecraft, a rocket booster or a debris object from an anti-satellite weapon that presents a threat of collision to an unmanned or manned spacecraft, and presents a risk of crashing in populated area in case of reentry to the earth's atmosphere and scattering hazardous chemicals, the space debris remover comprising:
  a vision sensor capturing a video image of the space debris object while the space debris remover chases, leads or travels in parallel with the space debris object maintaining constant distance with the space debris object;

a center of gravity estimator estimating center of gravity of the space debris object as an intersection of two segments: a segment connecting a first point on the space debris and a second point on the space debris that is different from the first point at a time instant, and a segment connecting the first point and the second point at a later time instant;

a rendezvous controller calculating a rendezvous control signal to propel the space debris remover towards the center of gravity of the space debris object, and to let a form bonding mechanism stick to the space debris object when the space debris remover comes in contact with the space debris object;

a star tracker measuring radial position of the space debris object with respect to the earth and angular position of the space debris object with respect to the earth;

a space debris mass estimation controller generating a space debris mass estimation control signal to apply mass estimation force that is constant force to the space debris object for a period of time;

a space debris mass estimator estimating mass of the space debris object by dividing the mass estimation force based on the space debris mass estimation control signal from the space debris mass estimation controller by a product of the radial position of the space debris object with respect to the earth and a second order time derivative of the angular position of the space debris object with respect to the earth from the star tracker;

an angular thrust calculation unit calculating angular thrust as an impulse function of time with amplitude thereof inversely proportional to desirable time of travel of the space debris object to the sun;

an angular momentum estimator estimating angular momentum of the space debris object by subtracting a first order time integral of the angular thrust from a product of effective mass of the space debris object and the earth that is inverse of sum of one divided by mass of the space debris and one divided by mass of the earth, a square of radial position of the space debris object with respect to the earth and a first order time derivative of the angular position of the space debris object with respect to the earth;

a radial thrust calculation unit calculating radial thrust as a function of the first order time integral of the angular thrust, the angular momentum of the space debris object, the mass of the space debris object and the radial position of the space debris object with respect to the earth inversely proportional to a square of the radial position of the space debris object with respect to the earth;

a space debris removal controller calculating time of travel of the space debris object to the sun as a function of the radial position of the space debris object with respect to the earth and a first order time derivative of the angular position of the space debris object with respect to the earth inversely proportional to a square of the radial position of the space debris object with respect to the earth and the first order time derivative of the angular position of the space debris object with respect to the earth; and calculating firing time that is time for a plurality of first stage thrusters to generate the radial thrust and the angular thrust;

the plurality of first stage thrusters propelling the space debris remover towards the center of gravity of the space debris object based on the redezvous control signal from the rendezvous controller; applying the mass estimation force to the space debris object based on the space debris mass estimation control signal from the space debris mass estimation controller; and generating the radial thrust and the angular thrust based on the space debris removal control signal from the space debris removal controller;

a stage separator separating a first stage of the space debris remover comprising the plurality of first stage thrusters, and a second stage of the space debris remover comprising a plurality of second stage thrusters and a foam bonding mechanism at separation time that is a time instant after the radial thrust decreases below a predetermined value;

the plurality of second stage thrusters generating the radial thrust and the angular thrust after the separation time, and propelling the space debris object towards the sun; and the foam bonding mechanism sticking to the space debris object when the space debris remover comes in contact with the space debris object.

* * * * *